US008635543B2

(12) United States Patent
Dingle et al.

(10) Patent No.: US 8,635,543 B2
(45) Date of Patent: Jan. 21, 2014

(54) MULTIPLE UI PARADIGMS WITHIN A SINGLE APPLICATION

(75) Inventors: Gregg R. Dingle, Bothell, WA (US); Timothy P. Cooper, Redmond, WA (US); Jeffrey J. Blucher, Seattle, WA (US); Julianne Prekaski, Seattle, WA (US); Ashvin J. Mathew, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 938 days.

(21) Appl. No.: 11/851,966

(22) Filed: Sep. 7, 2007

(65) Prior Publication Data

US 2009/0070701 A1   Mar. 12, 2009

(51) Int. Cl.
*G06F 3/00* (2006.01)

(52) U.S. Cl.
USPC .......................................... 715/762; 715/778

(58) Field of Classification Search
USPC ................................................ 715/762, 778
See application file for complete search history.

(56) References Cited

U.S. PATENT DOCUMENTS

| | | | | |
|---|---|---|---|---|
| 5,694,150 A | | 12/1997 | Sigona et al. | 345/145 |
| 5,963,924 A | * | 10/1999 | Williams et al. | 705/40 |
| 5,987,426 A | * | 11/1999 | Goodwin, III | 705/21 |
| 6,002,395 A | * | 12/1999 | Wagner et al. | 715/763 |
| 6,002,398 A | | 12/1999 | Wilson | 345/346 |
| 6,166,736 A | * | 12/2000 | Hugh | 715/798 |
| 6,266,666 B1 | * | 7/2001 | Ireland et al. | 707/770 |
| 6,501,464 B1 | * | 12/2002 | Cobbley et al. | 345/173 |
| 7,451,134 B2 | * | 11/2008 | Krakowiecki et al. | 1/1 |
| 2003/0070005 A1 | * | 4/2003 | Mukundan et al. | 709/330 |
| 2003/0103064 A1 | * | 6/2003 | Knighton et al. | 345/660 |
| 2004/0202073 A1 | * | 10/2004 | Lai et al. | 369/47.33 |
| 2004/0261038 A1 | * | 12/2004 | Ording et al. | 715/792 |
| 2005/0010877 A1 | * | 1/2005 | Udler | 715/826 |
| 2005/0071737 A1 | | 3/2005 | Adendorff et al. | 715/500 |
| 2005/0171853 A1 | | 8/2005 | Fettig et al. | 705/22 |
| 2006/0161859 A1 | | 7/2006 | Holecek et al. | 715/781 |
| 2006/0206834 A1 | | 9/2006 | Fisher et al. | 715/777 |
| 2007/0005449 A1 | | 1/2007 | Mathew et al. | 705/27 |
| 2007/0027782 A1 | * | 2/2007 | Homier et al. | 705/30 |

FOREIGN PATENT DOCUMENTS

WO    WO 01/86482    11/2001

OTHER PUBLICATIONS

"The Graphical User Interface," http://www-sop.inria.fr/mascotte/mascopt/graph_guide/gui.html, May 2005, pp. 1-3.
"New BroadWare Media Management System Streamlines Video Surveillance Operations and Enables Powerful, Secure Networked Video," http://www.broadware.com/news/press_releases/2006/0809, Aug. 2006, pp. 1-2.
"Fast User Switching," http://www.apple.com/macosx/features/fastuserswitching/, prior to Sep. 7, 2007, pp. 1-14.

* cited by examiner

*Primary Examiner* — William Bashore
*Assistant Examiner* — Gregory A DiStefano
(74) *Attorney, Agent, or Firm* — Kelly, Holt & Christenson, PLLC

(57) ABSTRACT

A user interface (UI) with multiple UI paradigms. Each of the multiple UI paradigms is substantially different from the other UI paradigm(s). The substantially different UI paradigms are within a single application. A switching mechanism, which is also a part of the single application, enables a user to relatively rapidly switch between the different UI paradigms.

6 Claims, 6 Drawing Sheets

MULTIPLE UI PARADIGMS WITHIN A SINGLE APPLICATION

BACKGROUND

In general, applications are programs used to automate tasks that were previously carried out by specially trained employees. Examples of applications are programs used for word processing, record keeping, numerical spreadsheet-like analysis and other business needs. Each application is usually tailored to automate a specific task or a group of related tasks. Therefore, a typical application includes one primary user interface (UI) view (usually a default view that is displayed when the application starts or is switched to), and any changes to the primary UI view occur within a contained scope set by the primary UI view. Such a primary UI view, along with any changes to the primary UI view that can occur within a contained scope set by the primary view, are collectively referred to herein as a UI paradigm. For example, a typical word processing application includes a single UI paradigm having a primary document view and search views, help views, etc., that are substantially contained within (or within the scope of) the primary document view. Such a configuration of a UI may not be optimal for certain applications.

The discussion above is merely provided for general background information and is not intended to be used as an aid in determining the scope of the claimed subject matter.

SUMMARY

Embodiments disclosed in the application relate to a user interface (UI). The UI includes multiple (two or more) UI paradigms, each of which is substantially different from the other UI paradigm(s). The substantially different UI paradigms are within a single application. A switching mechanism, which is also a part of the single application, enables a user to relatively rapidly switch between the different UI paradigms.

This Summary is provided to introduce a selection of concepts in a simplified form which are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

While the above-identified figures set forth one or more embodiments of the UI, other embodiments are also contemplated, as noted in the disclosure. In all cases, this disclosure presents the UI by way of representation and not limitation. It should be understood that numerous other modifications and embodiments can be devised by those skilled in the art which fall within the scope and spirit of the principles of this disclosure.

DETAILED DESCRIPTION

Disclosed are embodiments that enable switching between at least two substantially different user interface (UI) paradigms within a single application. Several exemplary embodiments are described below in connection with FIGS. 1 through 4.

Figure 1:
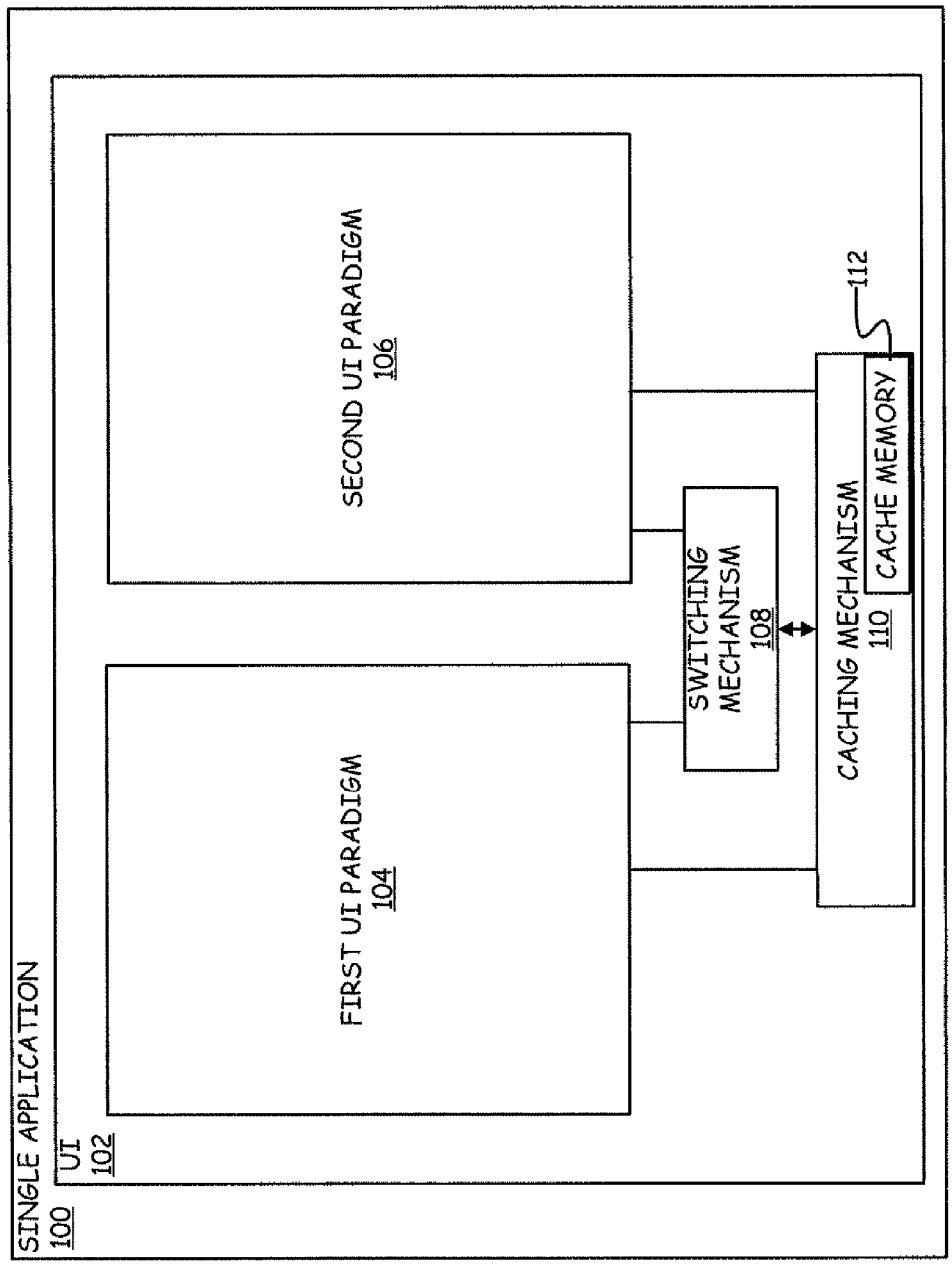
FIG. 1 is a simplified block diagram of an exemplary user interface (UI) embodiment that employs two substantially different UI paradigms.

FIG. 1 is a simplified block diagram of one exemplary embodiment that employs two substantially different UI paradigms within a single application 100. Specific examples of substantially different UI paradigms are provided further below in connection with FIGS. 2 through 4.

As can be seen in FIG. 1, single application 100 includes a UI 102 having a first UI paradigm 104 and a second UI paradigm 106. Either the first UI paradigm 104 or the second UI paradigm 106 can be the default UI paradigm when the application 100 starts. In a specific embodiment, the first UI paradigm 104 and the second UI paradigm 106 are within a single application executable. As used herein, a single application executable can be a single independent executable file or a single executable file that depends on, or is bound to, other assemblies (for example, other dynamic link library files). UI 102 also includes a switching mechanism 108 that enables a user to switch between the first UI paradigm 104 and the second UI paradigm 106. A specific example of a switching mechanism is described further below in connection with FIG. 2. In a specific embodiment, the first UI paradigm 104, the second UI paradigm 106 and the switching mechanism 108 are within a single application executable. UI 102 further includes a caching mechanism 110 that operates in conjunction with switching mechanism 108. Caching mechanism 110 saves a state of any one of the first UI paradigm 104 and the second UI paradigm 106 when a paradigm switching operation is carried out. Mechanism 110 thereby helps preserve the user's context between switches. Data corresponding to a state of the first UI paradigm 104 or the second UI paradigm 106 is stored within cache memory 112, and the saving and retrieval of this data is carried out with the help of suitable software within caching mechanism 110 and/or within switching mechanism 108. An exemplary switching mechanism is described below in connection with FIG. 2.

Figure 2:
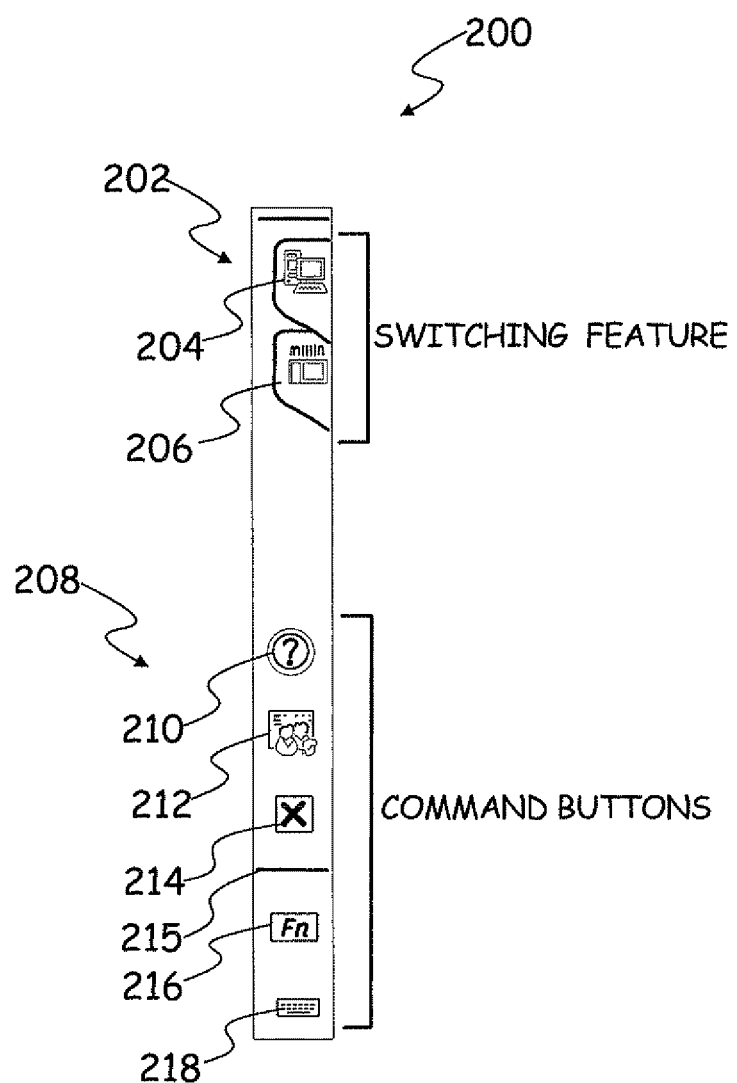
FIG. 2 is a diagrammatic illustration of a switching panel, which is a specific embodiment of a switching mechanism included in the UI of FIG. 1.

FIG. 2 is a diagrammatic illustration of a switching panel 200, which is a specific switching mechanism embodiment. Switching panel 200 provides a user with the ability to relatively rapidly switch between two distinct UI paradigms. As an be seen in FIG. 2, switching panel 200 includes a switching feature such as switching tab region 202, which, in this specific embodiment, includes a first switching tab 204 and a second switching tab 206 that control the switching between the two different UI paradigms. Panel 200 further includes a command-activation feature 208, which, in the specific embodiment of FIG. 2, includes one or more command buttons to invoke application functionality. The switching tabs and command buttons may be positioned vertically as depicted in FIG. 2 or may have other orientations as well.

Each switching tab 204, 206 is a clickable (or, in general, selectable) region, by mouse, keyboard, touch, or any other suitable mechanism/technique, and may contain tool tips for user assistance. In addition, the switching tab 204, 206 may contain a text, image, or both to communicate its usage to the user. Further, individual tabs 204, 206 can have a disabled appearance when the UI paradigm represented by the tab 204, 206 is not available to the user. When a switching tab 204, 206 is clicked (or otherwise selected or enabled), the application switches to that UI paradigm and the selected tab 204, 206 changes appearance to indicate the currently active UI paradigm or application view.

As noted above, application command buttons are also included in panel 200. The command buttons are used to invoke application functionality within the currently selected UI paradigm or view. The command buttons are also mouse, keyboard, and touch enabled. Of course, other suitable mechanisms/techniques can be employed to enable the command buttons. Also, in some embodiments, the command buttons change appearance briefly when clicked and may support tool tips for user assistance. Further, in some embodiments, the command buttons can also change appearance when "rolled over" (i.e., when the mouse cursor is on the button, but the user has not clicked the mouse button). In the specific embodiment of FIG. 2, there are two classifications of command buttons—those that invoke an action (i.e. those above the line 215 in region 208) and those that alter a view (i.e. those below line 215). In FIG. 2, the command buttons that invoke an action include a help command button 210 used to invoke application help, a switch user command button 212 used to log out the current user of the application and login as a different user and an exit command button 214 used to exit the application. The command buttons that alter a view include a function key command button 216 to toggle the visibility of function buttons in a main application window to an on or off state, and a keyboard command button 218 to toggle the visibility of a touch-optimized keyboard view in a main application window to an on or off state. A specific use of switching panel 200 in a point of sale (POS) application is described below in connection with FIGS. 3A and 3B.

Figure 3A:
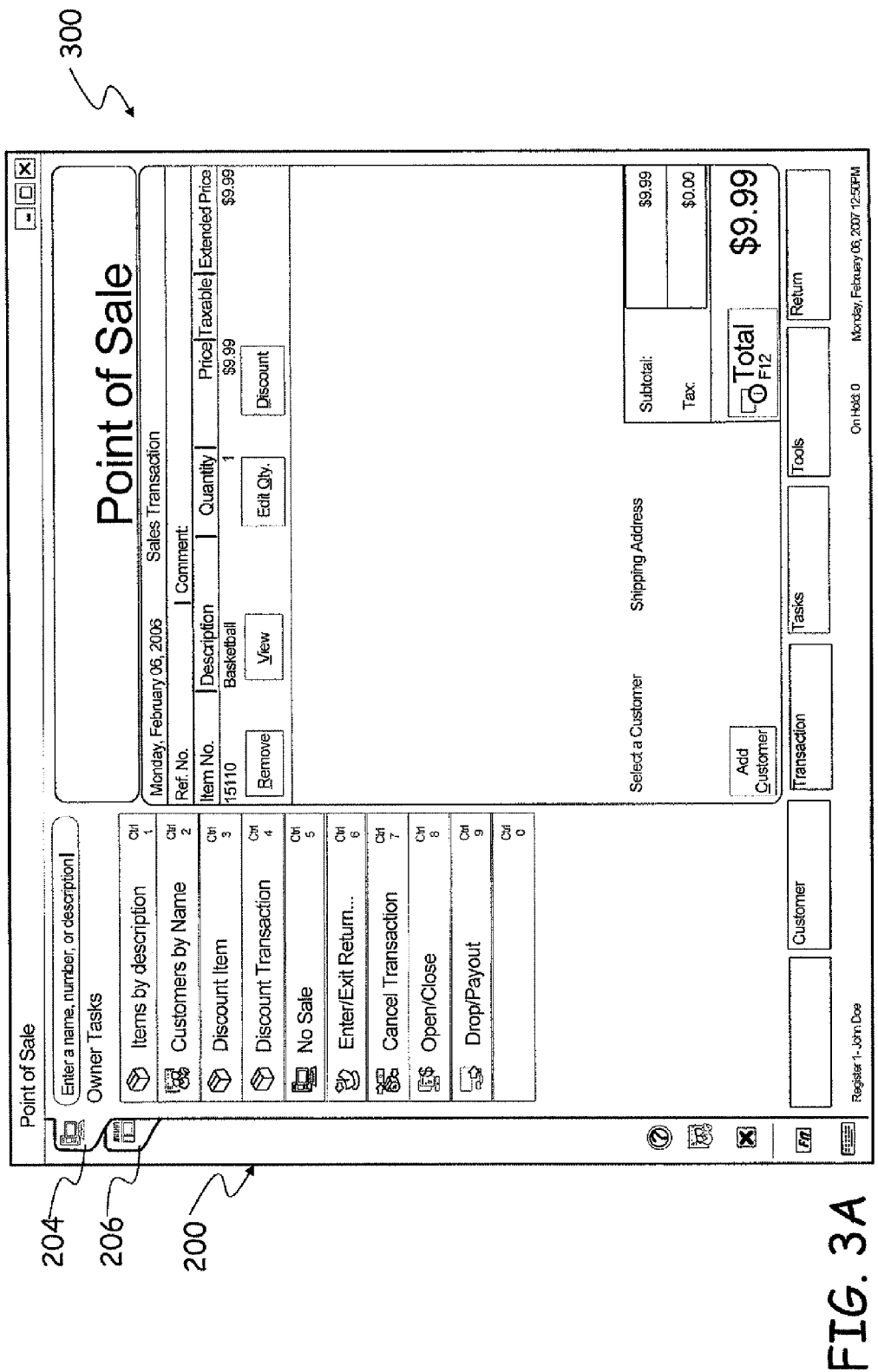
FIGS. 3A and 3B are diagrammatic illustrations of two substantially different UI paradigms employed in a point of sale application.
Figure 3B:
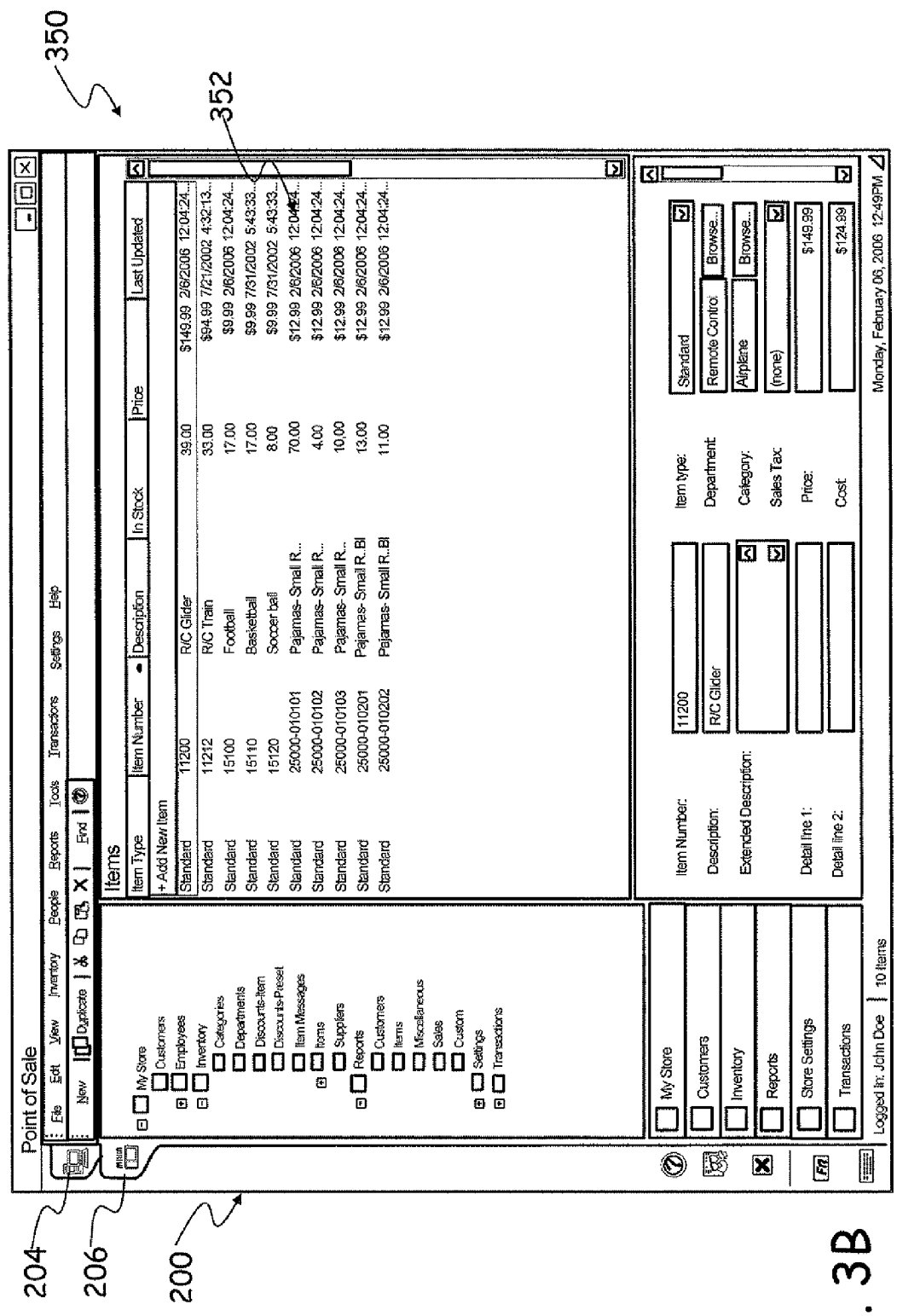

The example POS application has two distinct UI paradigms or application views—a touch-optimized view 300, shown in FIG. 3A and referred to herein as a transaction view, which is used by a cashier, for example, to process transactions, and a mouse and keyboard optimized management view 350 to handle data management tasks such as managing inventory, store settings, register settings, cashiers, etc. As can be seen in FIGS. 3A and 3B, switching panel 200 enables switching between transaction view 300 and management view 350.

As indicated above, in FIG. 3A, the active view is transaction view 300, which, in the specific embodiment shown in FIG. 3A, is a touch-optimized view. Here, switching tab 204 has a 'selected' appearance and (through use of colors) appears connected to transaction view 300. Whereas, switching tab 206 which is used for activating the management view 350 has an appearance that it can be selected (i.e., it does not appear disabled), but is not the currently active view and therefore does not appear connected to transaction view.

When the user touches or clicks, for example, switching tab 206 to show management view 350, the POS application performs a fast-switch and the management view 350 becomes the active view as shown in FIG. 3B.

When performing a switch, the POS application maintains a state of the original view so that if the user returns to that view, it appears the same as when he or she left. For example, if the user were to change their view from a list of items 352 in the management view depicted in FIG. 3B to a list of suppliers, then a switch to the touch-optimized transaction view 300 to perform a sales transaction, and then a switch back to the management view 350, the list of suppliers would still be displayed as the user had last seen it.

The state of the view, whether in the touch-optimized or management view, is cached in order to support the switch. As described generally in connection with FIG. 1, the user interface, as well as its underlying processing architecture, maintains the state of the application to preserve the user's context between switches.

Figure 4:
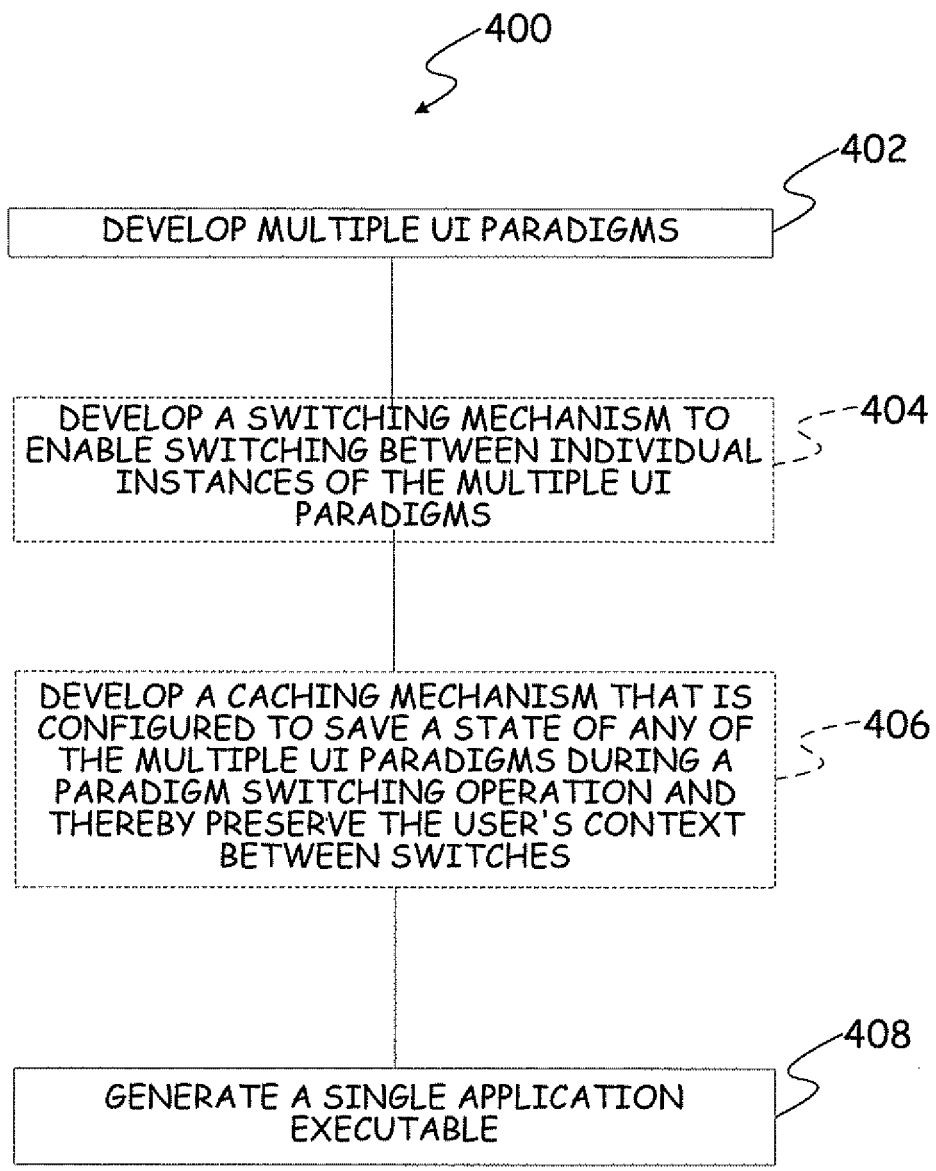
FIG. 4 is a simplified flowchart of a method embodiment.

FIG. 4 is a simplified flowchart 400 of a method embodiment. As can be seen in FIG. 4, at step 402, multiple UI paradigms are developed. Step 404 involves developing a switching mechanism to enable switching between individual ones of the multiple UI paradigms. At step 406, a caching mechanism, which saves a state of any of the multiple UI paradigms during a paradigm switching operation, is developed. Step 408 involves developing a single application executable that binds at least portions of the caching mechanism along with the multiple UI paradigms and the switching mechanism. It should be noted that in some embodiments, a single application executable, that binds the multiple UI paradigms, can be generated after step 402. In other embodiments, a single application executable, that binds the multiple UI paradigms along with the switching mechanism, can be generated after step 404.

In one embodiment, developing multiple UI paradigms comprises developing multiple point of sale UI paradigms. The multiple point of sale user paradigms can include a management view and a transaction view. In a particular embodiment, developing a switching mechanism comprises developing a switching panel that comprises a fast switching feature and a program tray.

Figure 5:
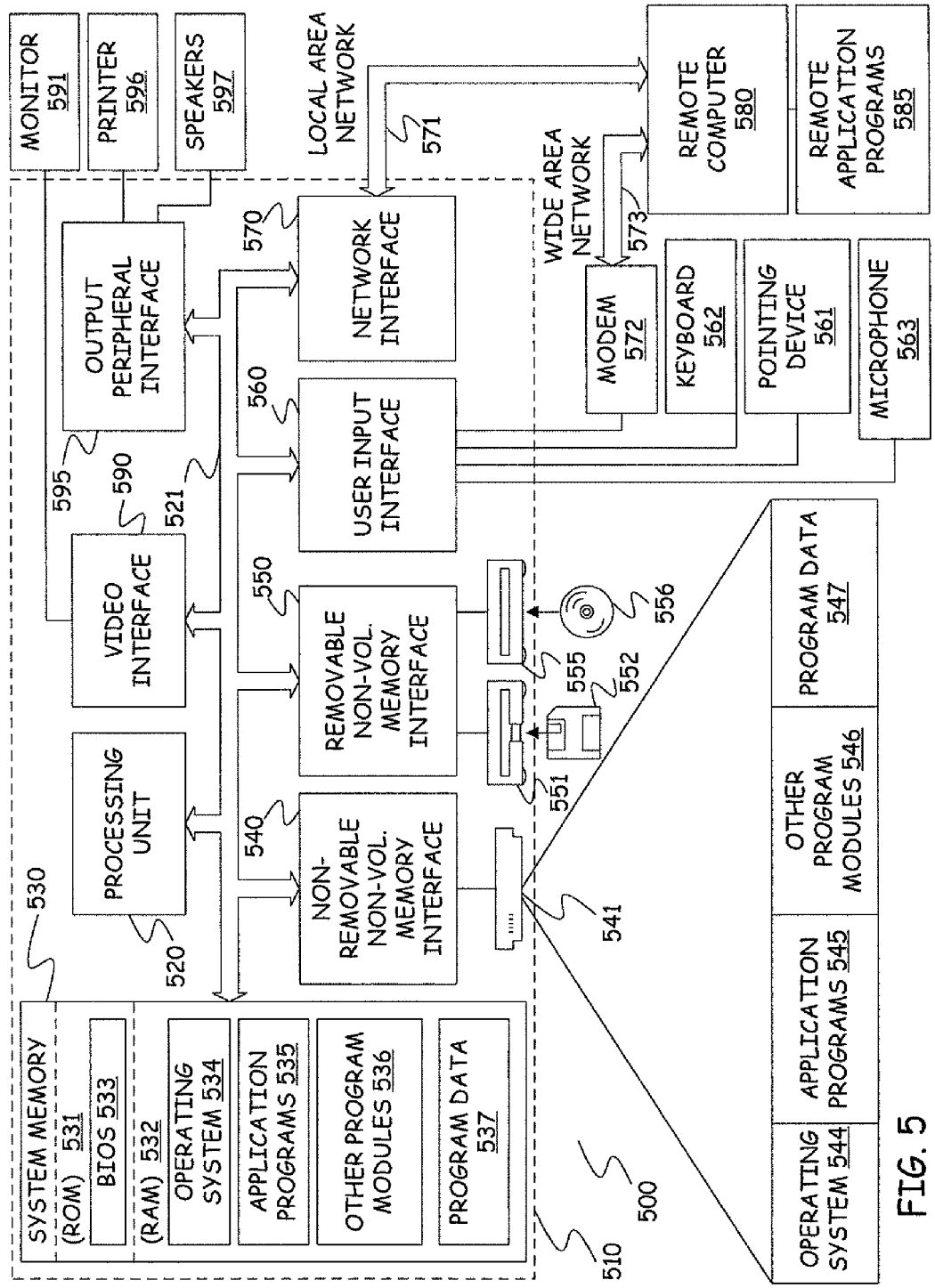
FIG. 5 is a simplified block diagram that illustrates an example of a suitable computing system environment on which UI embodiments may be implemented.

FIG. 5 illustrates an example of a suitable computing system environment 500 on which above-described UI embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500. Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, televisions, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies.

A user may enter commands and information into the computer 510 through input devices such as a keyboard 562, a microphone 563, and a pointing device 561, such as a mouse, trackball or touch pad. Other input devices (not shown) may include a joystick, game pad, satellite dish, scanner, or the like. Still other input devices (not shown) can include non-human sensors for temperature, pressure, humidity, vibration, rotation, etc. These and other input devices are often connected to the processing unit 520 through a user input interface 560 that is coupled to the system bus, but may be connected by other interface and bus structures, such as a parallel port, game port or a USB. A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented on a computer, comprising:
displaying a first, touch-optimized UI paradigm having a first primary point of sales transaction view and a first set of sub-views that are selectable for display to provide sales transaction tasks for a point of sales application;
displaying a list of the sales transaction tasks;
receiving selection of a sales transaction task from the list;
displaying a sub-view from the first set of sub-views corresponding to the selected sales transaction task;
performing a paradigm switching operation using a computer processor; and
displaying a second, mouse and keyboard optimized UI paradigm having a second primary point of sales management view and a second set of sub-views that are selectable for display within the second primary view and display data for the point of sales application.

2. The method of claim 1, and further comprising:
displaying a switching panel having a switching feature and a program tray comprising a keyboard command button that toggles display of a touch-optimized keyboard; and
performing the paradigm switching operation in response to selection of the switching feature.

3. The method of claim 2, further comprising:
saving a state of the first UI paradigm including a selected sub-view of the first UI paradigm when the paradigm switching operation is performed.

4. The method of claim 3 and further comprising
performing a second paradigm switching operation to return to the first UI paradigm; and
automatically displaying the selected sub-view of the first UI paradigm.

5. The method of claim 1, wherein displaying the first UI paradigm comprises displaying the first UI paradigm in a first configuration, the method further comprising:
performing a second paradigm switching operation and automatically displaying the first UI paradigm in a second configuration that is substantially the same as the first configuration.

6. The method of claim 1 wherein the program tray comprises at least one of a function key command button and a switch user command button.

* * * * *